(No Model.) 3 Sheets—Sheet 1.

J. V. GUE.
FEED MECHANISM FOR SAWING MACHINES.

No. 490,748. Patented Jan. 31, 1893.

WITNESSES:
W. H. Randall,
H. E. Chase,

INVENTOR
Jerome V. Gue
BY
Hoy Wilkinson & Parsons
ATTORNEY

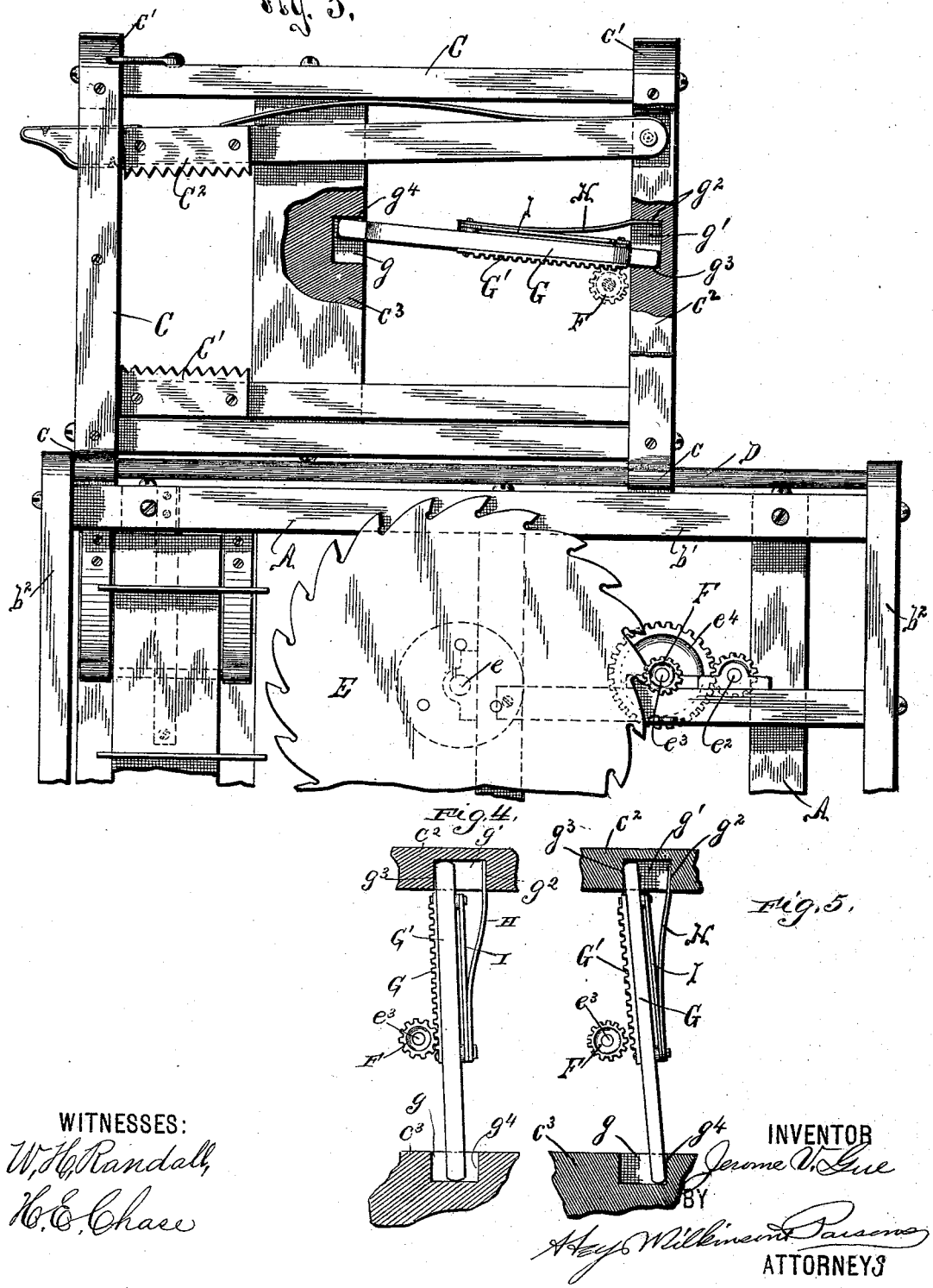

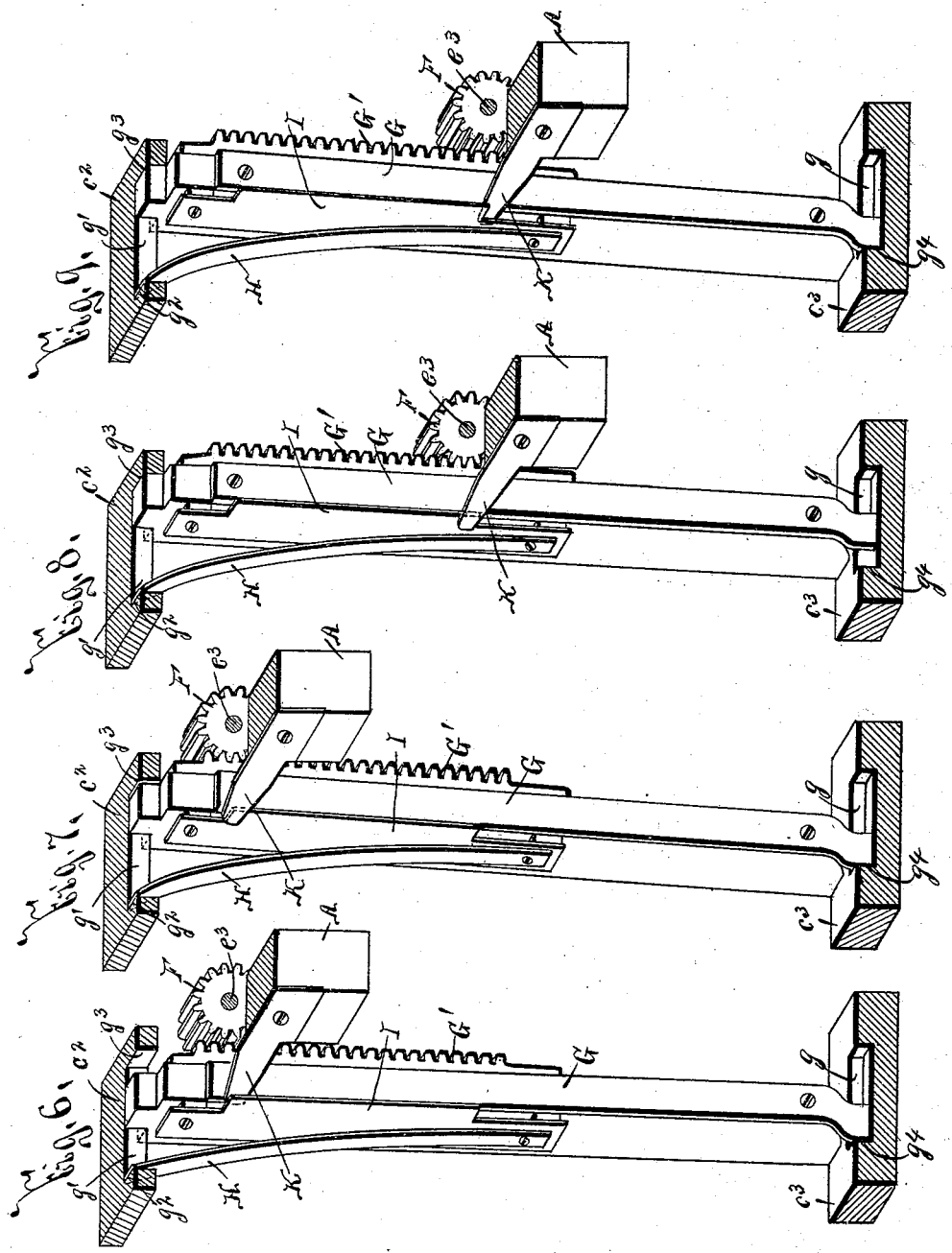

UNITED STATES PATENT OFFICE.

JEROME V. GUE, OF NORTH WESTERN, NEW YORK.

FEED MECHANISM FOR SAWING-MACHINES.

SPECIFICATION forming part of Letters Patent No. 490,748, dated January 31, 1893.

Application filed October 13, 1890. Serial No. 367,941. (No model.)

*To all whom it may concern:*

Be it known that I, JEROME V. GUE, of North Western, in the county of Oneida, in the State of New York, have invented new and useful Improvements in a Feed Mechanism for Sawing-Machines, of which the following, taken in connection with the accompanying drawings, is a full, clear, and exact description.

My invention relates to improvements in feeds for cutting machines, and particularly that class termed "shingle-cutting machines," in which the carriage, for the block to be cut, is fed toward and away from the cutter; and has for its object the production of a simple and effective construction, whereby, after being fed toward the cutter, the carriage and its forward feeding mechanism are automatically disengaged; and to this end it consists, essentially, in a frame having a cutter, a carriage guided on said frame toward and away from the cutter, a feed for moving the carriage, an engaging face upon the carriage for engaging with said feed on the forward movement of the carriage, and a guide upon the frame for preventing the engagement of said engaging face with the feed upon the return movement of the carriage.

The invention also consists in the detail construction and arrangement of the parts, all as hereinafter more particularly described and pointed out in the claims.

In describing this invention, reference is had to the accompanying drawings, forming a part of this specification, in which, like letters indicate corresponding parts in all the views.

Figure 1:
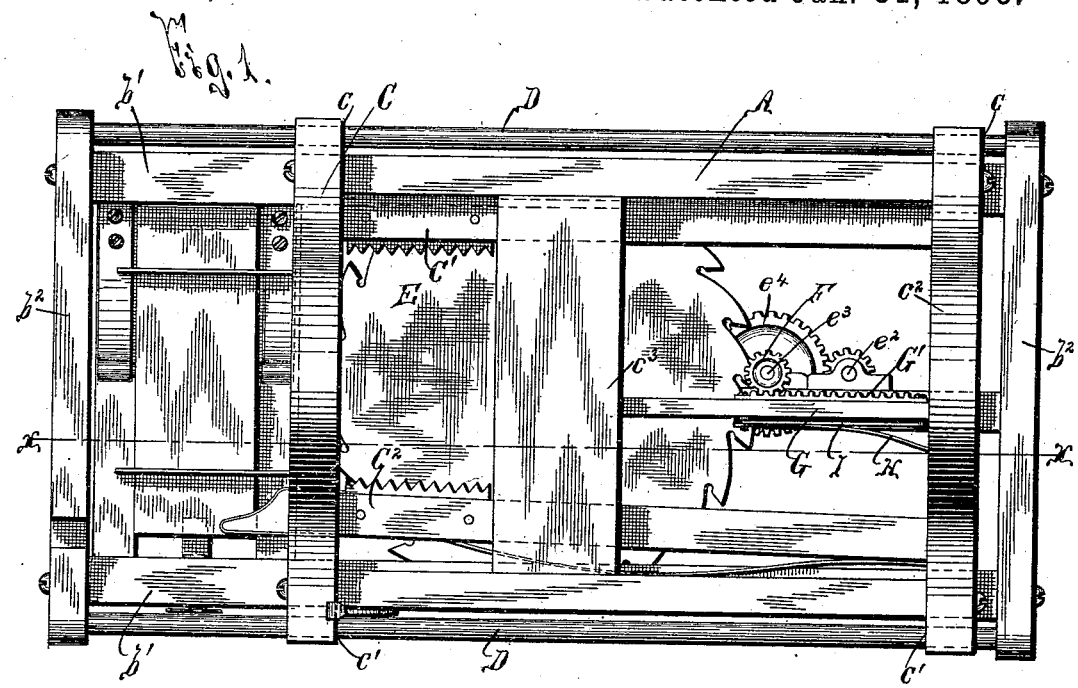
Figure 2:
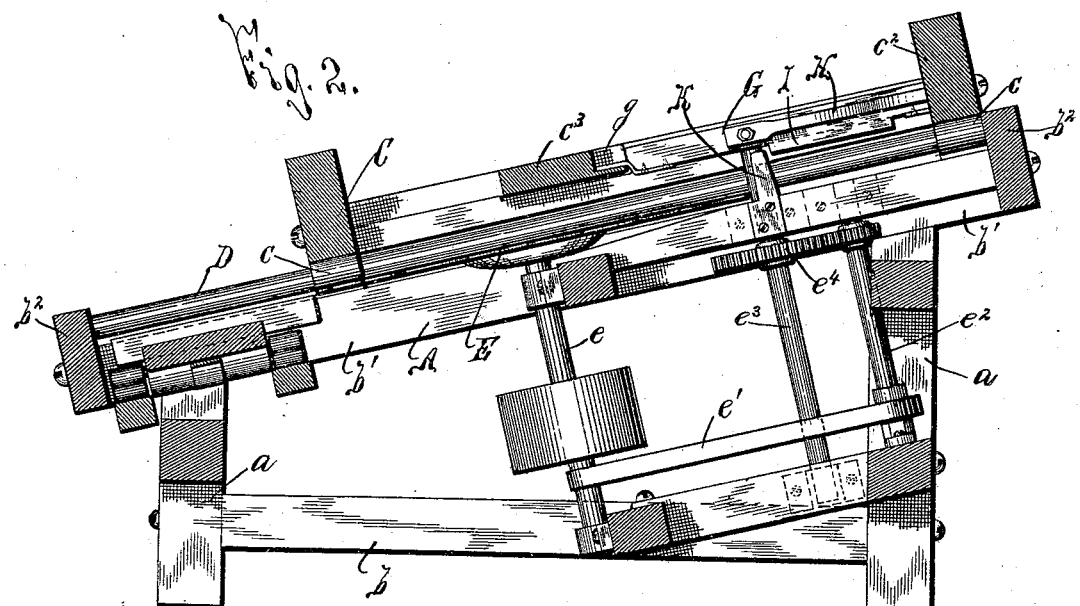

Figure 1 represents a top plan view of a shingle cutting machine embodying my improved invention, with the carriage shown as having almost completed its forward movement. Fig. 2 represents a longitudinal vertical sectional view, taken on line —$x$—$x$—, Fig. 1, with the carriage shown as having completed its upward movement. Fig. 3 represents a detached plan view of the machine as illustrated in Figs. 1 and 2, with the exception that the carriage is swung outward upon one of its guides as a pivot for the purpose of illustrating its inverted plan view; Figs. 4 and 5 are detail views, illustrating different positions of the rack movably mounted in the carriage and formed with a face for engaging the feed and Figs. 6, 7, 8, and 9 are inverted isometric perspectives for further representing the operation and construction of the movable rack on the carriage.

—A— represents the frame of the machine which may be of any desirable form and construction. As illustrated, the frame consists of the end uprights —$a$—$a$—, the lower side bars —$b$—, the upper inclining side bars —$b'$—, and the upper end bars —$b^2$—. Above one of the side rails —$b'$— are guide rods —D— having their opposite extremities mounted in the end frame bars —$b^2$—.

The carriage —C— is provided on one side with eyes —$c$— which embrace one of the guide rods —D—, and on the other with the depending projections —$c'$ which slide along the guides —D— as the carriage is moved toward and away from the cutter —E—. This cutter —E— is of desirable form, size and construction, and is here shown as a revolving saw journaled upon the shaft —$e$—, which drives the shaft —$e^2$— by a belt or other power transmitting mechanism —$e'$—.

The carriage —C— is driven by means of a feed —F—, here illustrated as a gear wheel mounted on the shaft —$e^3$— which is in turn driven from the shaft —$e^2$— by gearing —$e^4$—, whereby said cutter and feed are driven together in order that the feed of the carriage may be timed with the rotation of the saw.

The block from which the shingles are to be cut, is held at the lower end of the carriage by supports —$C'$— and —$C^2$—, the latter of which is movable.

In the operation of this machine, it is necessary to move the carriage lengthwise on its guides —D— in order that the block from which the shingle is to be cut may be fed to the saw, but on the return of the carriage it is desirable to disconnect its forward feeding mechanism, since the same is connected to the cutter, and if connected, would not permit the return of the carriage. This disconnection is effected by means of a rack —G— movably mounted on the carriage and provided with an engaging face or rack teeth —$G'$— for meshing with the feed wheel —F— and a spring —H— and a guide —K— for operating the rack as presently described. The opposite ends of this rack bar are mounted in recesses —g— and —g'— in the upper and central cross bars —c²— and —c³— of the carriage, and at the rear of the bar I provide a suitable spring —H— having one extremity bearing against the rack and the other against the rear wall —g²— of the upper recess —g'— as best seen in Figs. 4 to 9 inclusive. It will thus be readily understood that the spring —H— bearing against the rack tends constantly to force the rack —G— into position for engagement with the feed wheel —F—, and that during such engagement the carriage is fed upward. Projecting downwardly from the toothed portion of the rack is a rib —I— of less length than the rack, as best shown in Fig. 2.

Secured to the frame —A— is a guide or stud —K—, the upper extremity of which is adapted to bear against the depending rib I secured to the rack —G—, and this in connection with the spring —H— disengage its rack teeth or engaging face —G'— from the feed pinion. The spring —H— being at the upper part of the bar —G—, causes the same to normally assume an inclined position as shown at Figs. 3 and 7 with its upper extremity bearing against the rear wall —g³— of the upper slot —g'— and its lower extremity against the forward wall —g⁴— of the lower slot. As shown in said Figs. 3 and 7 the upper extremity of the rack is then engaged with the feed wheel and as the rack moves upward the rib —I— passes on the inside of the guide or stud —K— which constantly forces the rack toward the feed wheel —F— and causes the same to assume an approximately vertical plane, as shown at Figs. 4 and 8.

When the carriage is in its extreme upward position, the rib I passes beyond the upwardly extending end of the projection —K— and immediately the spring —H— forces the upper end of the rack into its inclined position and disengages it from the feed wheel, as shown at Figs. 5 and 9, whereupon the carriage returns by gravity. As the rack is disengaged from the feed wheel —F—, the lower extremity of the rib —I— is swung outward from said feed wheel, and as the carriage returns by gravity, the inner side of said rib bears against the guide or projection —K— and the forward extremity of the rack is thus forced away from the feed wheel as shown at Fig. 6 until the carriage reaches its extreme downward position, whereupon the upper extremity of the rib —I— passes below the guide —K— and the spring —H— immediately forces the rack into its inclined position and again engages the same with the feed wheel.

The aforesaid disconnecting mechanism is very simple in its construction, positive and automatic in its action.

The operation of my invention, will be readily perceived from the foregoing description and upon reference to the drawings, and it will be understood that the carriage is fed forward until its upward position is reached, whereupon its feeding mechanism is disconnected and the carriage returns to its downward position, when it is again connected with its feeding mechanism.

It is evident that the construction of the cutter is immaterial to my invention, and that the detail construction of the carriage feed disconnection may be somewhat varied from that described and shown, as for instance, when excessive resistance is not present, a plane faced wheel may be used instead of the wheel —F— and a plane bearing face instead of the gear teeth —G'—.

Having thus fully described my invention, what I claim as new, and desire to secure by Letters Patent, is:—

1. The combination with a frame, a projection —K— on the frame and a carriage movable reciprocally upon the frame; of a feed pinion journaled on the frame, a rack having both ends movably supported on the carriage and adapted to engage said pinion to effect the movement of the carriage, a spring for forcing the rack into its normal position in engagement with the pinion, and a rib on the rack having its opposite ends movable beyond the projection —K— and its opposite faces successively engaged by said projection as the carriage travels to and fro upon the frame, substantially as and for the purpose set forth.

2. In combination, a frame having a guide, a carriage movable on said guide and provided with a pair of slots, a feed gear wheel for moving said carriage, a rack having its opposite extremities movably mounted in the slots in said carriage for engaging said wheel, a depending rib on the rack of less length than the toothed portion of the rack, a spring for forcing the one extremity of said rack toward the feed wheel and the other extremity in an opposite direction, and a stationary projection on said frame for engaging the inner side of the rib upon the upward movement of the rack, substantially as and for the purpose specified.

In testimony whereof I have hereunto signed my name, in the presence of two attesting witnesses, at Rome, in the county of Oneida, in the State of New York, this 3d day of October, 1890.

JEROME V. GUE.

Witnesses:
GEO. BARNARD,
C. G. SILLENBECK.